United States Patent [19]

Konekamp et al.

[11] 4,198,804
[45] Apr. 22, 1980

[54] ROUND BALER MACHINE

[75] Inventors: Werner Konekamp, Herzebrock; Horst Harig, Harsewinkel; Heinrich Isfort, Dulmen, all of Fed. Rep. of Germany

[73] Assignee: Gebr. Claas Maschinenfabrik GmbH, Postfach, Fed. Rep. of Germany

[21] Appl. No.: 932,004

[22] Filed: Aug. 8, 1978

[51] Int. Cl.² .......................................... A01D 39/00
[52] U.S. Cl. ...................................... 56/341; 100/89
[58] Field of Search ............................. 56/341–343, 56/344, 345; 100/88, 89

[56] References Cited

U.S. PATENT DOCUMENTS

| 2,592,963 | 4/1952 | Sherrow | 56/249 |
| 2,909,887 | 10/1959 | Claas | 56/341 |
| 2,929,191 | 3/1960 | Lohnert | 56/341 |
| 3,662,528 | 5/1972 | Akgulian et al. | 56/249 |
| 4,119,026 | 10/1978 | Sacht et al. | 100/89 |

Primary Examiner—Russell R. Kinsey
Attorney, Agent, or Firm—Schroeder, Siegfried, Ryan, Vidas, Steffey & Arrett

[57] ABSTRACT

This invention relates to a round baler for windrowed fibrous agricultural materials in which the bales are formed by a two-part frame having a generally cylindrical baling zone therein defined by side wall members on the frame and roller members extending between the side wall members and distributed around the frame. The frame includes a conventional pickup and conveying apparatus to move the agricultural materials from the ground into the entrance of the cylindrical baling zone. A suitable drive means, adapted to be coupled to a power takeoff of a draft vehicle or mounted on the baler, rotates the roller members to form a bale of the agricultural materials which are fed to the baling zone by the pickup. The frame parts are separated through hydraulic actuators to open the baling zone and deposit the round bale therefrom. The baler includes an improvement of hollow roller members formed of sheet metal rolled into a cylindrical form with intermediate supporting discs distributed across the interior of the cylindrical form and seal plates at the ends of the cylinder which mount stub shafts for journaling the roller members. Seal members are mounted on the side walls and these seal members project into the ends of the roller members to coact with the seal plates to insure that the materials in the baling zone do not enter the area between the roller members and the side walls. In an alternate embodiment of the invention, the baler is modified by a special conveying means having oscillating tines driven with the roller members to advance materials from the pickup into the baling zone.

15 Claims, 5 Drawing Figures

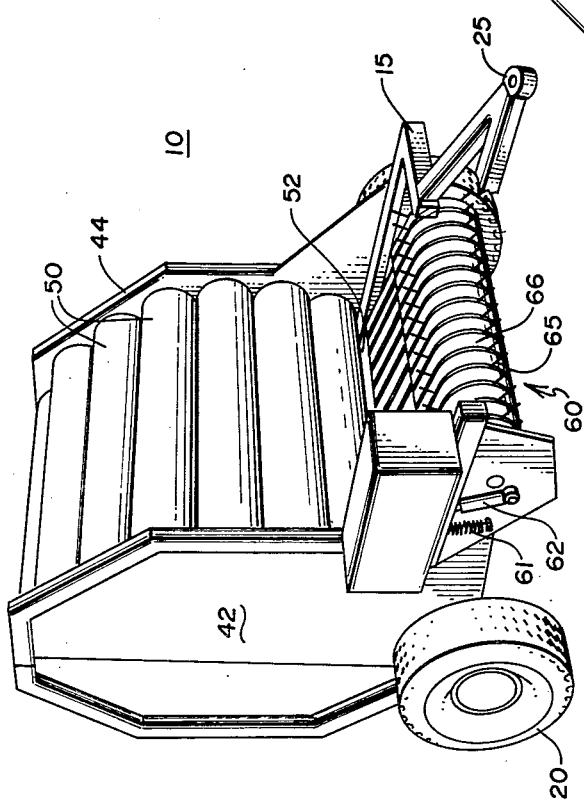

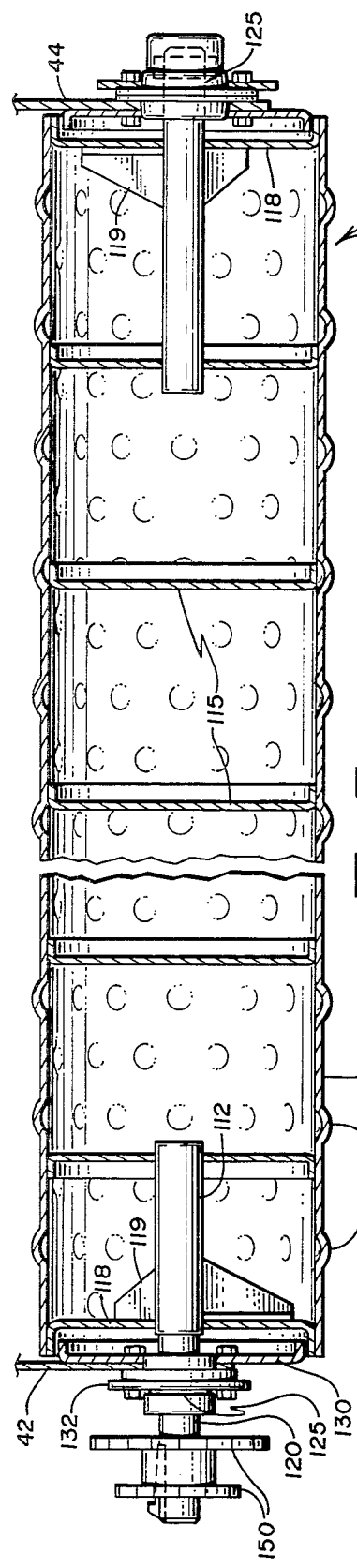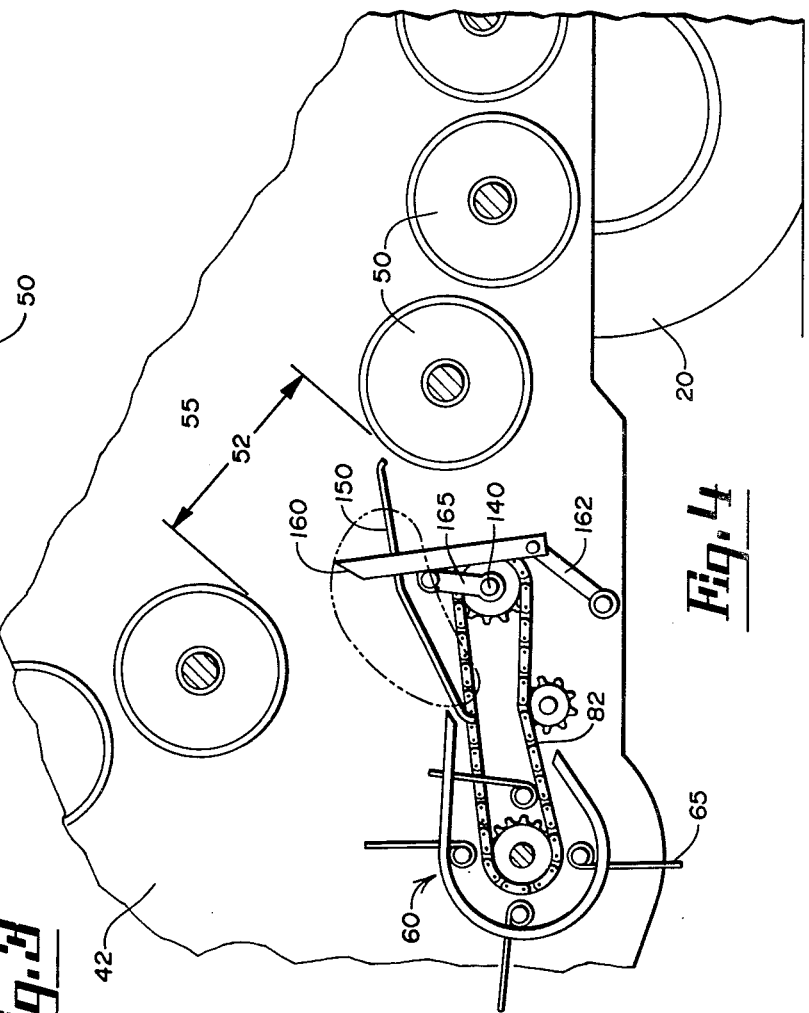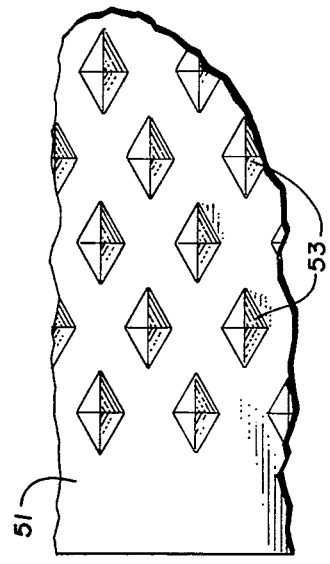

ROUND BALER MACHINE

FIELD AND BACKGROUND OF INVENTION

This invention relates to a machine for making round bales of fibrous agricultural material, and more particularly to an improved machine of this type which forms round bales in a frame having a generally cylindrical baling chamber defined by roller members which roll the material into the bale and deposit it outside of the frame.

Round bale forming machines are known and in use. The majority of the more practical forms use belts or chains moving over rollers which are connected by transverse rods in the bale forming chamber to shape and handle the material introduced into the bale chamber. This material is a loose fibrous material picked up from the ground by a suitable pick up device and introduced into the opening of the bale chamber. These units using belts and chains which come in contact with the harvested material are subject to extreme wear and limit the density of the bales which are formed thereby. In such machines, it is conventional to tie the round bale when it has reached the desired diameter and move or propel the bale from the baling chamber which may be opened to eject the bale therefrom. The belt forming apparatus and the associated tensioning structures which form a part of these machines are subject to failure and a high degree of wear which significantly increases not only the maintenance, but the initial expense of the same. In addition, the open area surrounding the belts in the bale forming chamber are subject to accumulation of materials in the forming of bales which present significant problems from malfunction and down time of the same. Examples of such prior structure will be found in U.S. Pat. Nos. 3,722,197 and 4,009,653.

SUMMARY OF THE INVENTION

The present invention is directed to a round bale forming machine in which the bale chamber is formed by a plurality of distributed roller members defining a cylindrical opening in which the bale is formed. The roller members extend between the sides of the frame of the machine and are interconnected at the ends to a suitable driving apparatus such that all roller members rotate in the same direction. The roller members are so spaced from one another and from the side walls that all material forming the bale is confined in the baling chamber substantially eliminating the possibility of plugging or material build-ups in the parts surrounding the baling chamber. Similarly, the roller members are so spaced as to apply a uniform compressive force to the bale to insure a density which increases from the inside out to provide a roll or bale which will withstand the elements upon storage. The roller members are relatively lightweight and hollow in construction with a surface having a plurality of raised protrusions distributed over approximately 30% of the same to provide a roughened surface which readily moves the material within the baling chamber. They are constructed to provide a uniform force across the bale for uniformity in bale size and density. This arrangement of parts enables formation of bales of good uniform density without excessive wear on the baler parts. The baler frame is a two-part structure which opens when the bale reaches such a density so as to apply pressure against the rollers and create a pressure differential in the actuators opening the same. The pressure differential is indicated on a meter which indicates the density of the bale. The operator may then open the frame and deposit the bale therefrom. The drive structure for the roller members is enclosed in a side wall of the frame, and it is formed by chain drives connected over sprockets on the ends of the roller members to rotate the same from an input gearing suitably energized from a power source which may be mounted on the baler or connected to a power takeoff of a tractor.

In an alternate embodiment of the invention, the conventional hay or flail-type pickup includes, in addition, oscillating tines which are used to advance the material from the pickup into the baling chamber. A suitable bale tieing apparatus is mounted on the frame which introduces the end of a piece of cord into the baling chamber to surround the bale in the final stages of formation and the cord is distributed around the extent of the bale to secure the bale in the rolled condition as it is removed from the baling chamber.

The improved simplified structure may be best understood from the attached description together with the drawings wherein:

FIG. 1 is a perspective view of the improved round baler with the input shaft and hydraulic lines omitted;

FIG. 2 is an enlarged side elevation view of the same with a side removed to show the relationship of parts;

FIG. 3 is an enlarged sectional view of a roller member of the round baler; FIG. 3a is a fragmentary view of an alternate surface of the same; and, FIG. 4 is a schematic side elevation view of a portion of a drive structure of a round baler showing an alternate embodiment of the drive.

DESCRIPTION OF PREFERRED EMBODIMENT

The improved round baler is shown generally at 10 in FIG. 1. The baler is built on a frame 15 having a wheeled support 20 connected to the frame and a tongue or draw bar 25 at the front end of the frame. As will be seen in FIG. 2, an input shaft 30 is positioned over the tongue and is connected to a suitable gearing box 35 to provide the motive drive for the baler parts. Suitable hydraulic lines 36 are also positioned on the frame and the hydraulic lines and input shaft are adapted to be connected to the hydraulic system and power takeoff of a draft vehicle, such as a tractor, for operating the baler. A stabilizing wheel 40, which is adjustable in height, is mounted at the front end of the frame 15 to aid in storage of the baler and to adjust the tongue for connection to and disconnection from the draft vehicle.

Frame 15 has two upstanding sides 42, and 44 between which are positioned a plurality of roller members indicated generally at 50, and within which is defined a baling zone 55. An opening 52 between the roller members on the forward end of the frame provides the entrance to the baling chamber, and a suitable pickup device 60 is mounted on the frame and suspended through springs 61 and shock absorbers 62 to pick up windrowed material from the ground and direct the material into the baling chamber through the opening 52. The pickup is formed of a plurality of tines 65 connected to a drive shaft with an adjacent shield or platen 66 having slots therein through which the tines move so as to lift and move material over the shield and into the baler. The frame, or the sides thereof, 42, 44, is split to define a forward and aft section which are piviotally connected through a pivot 70 on the top of the frame and permit opening of the baling zone to deposit the bales therefrom.

The drive for the roller members, as will be best seen in FIG. 2, is comprised of belts or chains connected to the gear box 35. The roller member drive is enclosed in one of the sides 42, and it utilizes suitable sprocket members, to be later identified, mounted on the ends of the roller members and rotated by the chains. Thus, in FIG. 2, the chain drive from the gear box 35 includes a first or power section 75 which couples to sprockets on a pair of roller members of the baling chamber with a suitable take-up or tensioning pulley 76 contacting the chain and being positioned on the frame. The first drive sections 75 is coupled to a similar lower drive section 80 which drives the bottom roller members disposed below the input opening and is also coupled through a secondary drive 82 to the driving means for the pickup 60. One of the roller members in the above mentioned pair of rollers is coupled through a similar drive unit 90 which couples the roller members on the upper section of the baler together and provides the rotational input thereto with a suitable take-up or tensioning roller 92 being positioned on the frame. The roller members on the rear section of the frame, which is pivoted to open, are coupled to the drive section 90 through an intermediate drive 94. This rear section 100 couples the remaining rollers with a suitable tensioning roller 102 included on the frame. Also mounted on the frame sides are a pair of hydraulic actuators 110, which actuators are connected between the parts of the frame to extend or open the rear section thereof for the purposes of depositing a bale from the baler. Similarly, the pickup drum with the tines 65 thereon may be raised or lowered through suitable means (not shown) for varying working conditions.

The roller members 50, as will be best seen in FIG. 3, are hollow drum-like members formed of sheet metal 51 having raised protrusions 53 and stub shafts 112 extending from the ends of the same. The raised protrusions on the sheet metal are formed by suitable means, such as by stamping, to form raised protrusions of approximately 3 to 9 mm for a 300 mm roller diameter. They are uniformly distributed over the surface of the roller and cover approximately 30% of the finished roller surface. These raised projections may take varying shapes, i.e., they may be formed by die surfaces having cross-sections which are circular or in the form of a parallelogram to give a generally diamond-shaped protrusion as shown in FIG. 3a. The raised protrusions on the roller members insure the efficient movement of the material in the baling chamber during the operation of the machine.

The roller members have intermediate discs 115 which are generally circular and are distributed or spaced along the interior of the hollow cylindrical form of the drums with similar end disc members or end seal plates 118 at the ends of the same. The stub shafts 112 are secured to the end discs or seal plates 118 and the nearest adjacent intermediate disc 115 with suitable flange members 119 welded to the end disc seal plates 118 and the shaft to rigidly position the same on the ends of the cylindrical roller members. The stub shafts are reduced and keyed, as at 120, in the projecting ends, and the shafts are mounted in bearing members 125 secured to the side walls 42 and 44 of the frame. Disc-shaped protecting flanges or shields 130 are also secured to the side walls with the bearing members, the shield having a transversely extending periferal edge which fit within a similar edge in the end disc members 118. The flanges or shield members 130 serve to aid in mounting the bearings on the side walls through suitable bolt means 132 and also to prevent any materials within the baling chamber from entering the space between the ends of the roller members and the side walls. The ends of the stub shafts within the side wall 42 having the enclosure mount suitable sprocket members, such as are indicated at 150, forming part of the drives for the baler. Depending upon the location of the shafts on the frame or their location within the drive trains, one or more sprocket members may be mounted on the ends of the shafts common to the side wall 42.

In operation, the improved round baler is normally adapted to be connected to a draft vehicle, such as a tractor, having a power takeoff and a suitable hydraulic system with a reversing valve for operating the hydraulic components of the baler. When connected, the baler is designed to pick up the windrowed agricultural material, such as straw, hay or fodder. The support wheels under the frame permit the baler to be drawn by the draft type vehicle over the ground and relative to the rows of windrowed material. The pickup drum has a width substantially equal to the baling zone and the distance between the spring tines of the pickup and the ground may be readily adjusted for proper collection of the windrowed material so that it may be directed into the baler. The pickup drum collects the material and transports the same loosely into the baling chamber. The roller members distributed around the frame define the baling chamber and these are driven so that they all move in the same direction with a slight spacing between the roller members. Initially, the hay or agricultural material will fill the baling chamber and it will start to roll into a round bale. Continuous operation of the baler will cause the newly admitted material to be wrapped around the bale in the baling chamber compacting the bale from the outside. Thus, a hard or more dense outside cover exists around a relative loose core which will hold the bale firmly together and protect it against the weather when it is stored outside. With the bale increasing in size and becoming harder, the oil pressure exerted on the hydraulic cylinders, which separate the frame, increases. The bale as it increases in size and density, attempts to force the frame parts apart. The pressure gauge responding to the pressure on the hydraulic actuators indicates this pressure increase and when a desired final pressure is reached, the bale is suitably tied with twine through means not shown. At this time, the operator operates a valve on the draft vehicle to open the frame and the motion of the roller members will deposit the bale on the ground.

The improved roller members are relatively lightweight and have a strength to exert a uniform force across the width of the baler compacting the outer layers of the bale. A dimpled surface on the roller members aids in moving the material in the baling chamber. The improved roller member construction further prevents the lodging of any loose material around the journaling portion of the roller members to prevent malfunction of the same. Similarly, the spacing between the roller members and the direction of rotation of the same are such that the material is confined in the baling chamber as the bale is formed For certain types of agricultural materials, which are coarser in nature, it is sometimes advisable to modify the entrance to the baling chamber to insure the introduction of the material thereto. Thus, as will be seen in FIG. 4 where a portion of the side elevation of the baler is shown, the baler construction is modified by the removal of one of the roller members adjacent to and defining the entrance to the baling chamber. A modified arrangement for introducing the material from the pickup platen to the baling chamber is substituted for this roller member.

In this embodiment, the construction of the baler in general, together with the details of the roller members and the drive remains unchanged. As will be seen in FIG. 4, the lower roller member 50 which formerly formed part of the drive section 80 driven from the input drive train 75 is replaced by a shaft 140 having the drive sprocket thereon. The drive sprocket also forms a part of the secondary drive 82 providing the input motion to the pickup device. In place of the lower roller member at the entrance to the baling chamber, a platen surface 150 is positioned. The platen surface has slots therein similar to the surface 66 of the pickup unit 60. This surface extends between the pickup device and the next adjacent roller member and a plurality of pivoted tines 160 move in the slots. The tines are distributed across the input area of the baling chamber and each is mounted on a pivoted lever 162 which is pivoted on the frame, with the tines being connected to a bell crank 165 mounted on the shaft 140. A plurality of such bell cranks are supported by the shaft to correspond with the tines. The bell crank describes a circular path with rotation of the drive section 80 and causes the pivoted tines 160 to pivot from a position adjacent the pickup device to a position adjacent the next adjacent roller member with the tines being raised and lowered within the slots. This will move the agricultural material from the pickup platen across the platen surface 150 to the position next to the adjacent roller member where it will be fed into the baling chamber. With this improvement, relatively course material may be moved into the baling chamber and baled in the manner described above. In all other aspects, the operation of the baler remains unchanged.

In considering this invention it should be remembered that the present disclosure is illustrative only and the scope of the invention should be determined by the appended claims.

What we claim is:

1. In a round baler for windrowed fibrous agricultural materials comprising: a two-part frame having a generally cylindrical baling zone therein defined by side wall members of the frame and roller members extending between and distributed around the frame being journaled in the side wall members; pickup and conveying means mounted on the frame forward of the baling zone and communicating with the cylindrical baling zone, drive means connected to the pickup conveying means and the roller members for operating same to pick up fibrous materials from the ground and advance the materials in the baling zone wherein said roller members roll the material into a round bale, means pivotally connecting the parts of the frame to open the baling zone and deposit the round bale therefrom, the improvement residing in the construction of the roller members which are formed of sheet metal rolled into a cylinder with stub shafts and a seal plate at each end of the cylinder, and shield members secured to the side walls of the frame and projecting into the ends of the roller members adjacent the seal plates to prevent the ingress of material between the roller members and the side walls.

2. The round baler of claim 1 and including intermediate reinforcing discs distributed within the cylinder along the extent of the same.

3. The round baler of claim 2 in which each seal plate is a disc shaped member secured to a stub shaft forming a flanged extremity sealed to the cylinder with the shield members of the side walls having a similar shape and fitting into the seal plate.

4. The round baler of claim 3 in which each seal plate has triangular-shaped reinforcing webs securing the stub shaft to the seal plate.

5. The round baler of claim 2 in which the intermediate reinforcing discs are disc-shaped with flanged extremities which bear aginst the inner surface of the cylinder and are welded thereto.

6. The round baler of claim 1 including hydraulic actuator means connected between the parts of the frame with differential pressure sensing lines connected to the ends of the hydraulic actuator to indicate pressure on the roller members by the bale through force imparted between the parts of the frame to the hydraulic actuator means.

7. The round baler of claim 1 in which the conveying means includes reciprocating tine members mounted on the frame and positioned between the pickup and the baling zone on the frame.

8. The round baler of claim 7 in which the reciprocating tines include pivoted levers with the tine members pivoted on the end of the same and connected to a rotating bell crank to reciprocate the tine members.

9. The round baler of claim 8 in which the pickup and reciprocating tines include a flat surface extending between the side walls of the frame with slots therein in which the pickup and the reciprocating tine members move.

10. The round baler of claim 1 in which the sheet metal forming the cylinders of the roller members includes a plurality of raised protrusions distributed over its exterior surface.

11. The round baler of claim 10 in which the protrusions cover approximately 30% of the exterior surface of each roller machine.

12. The round baler of claim 10 in which the protrusions have a height of approximately 3–9 mm for a 300 mm diameter roller member.

13. The round baler of claim 12 in which the protrusions are uniformly spaced on the surface of the roller member.

14. The round baler of claim 13 in which the protrusions have a rounded cross-section.

15. The round baler of claim 13 in which the protrusions have a diamond shaped cross-section.

* * * * *